H. V. HAIGHT.

UNLOADER FOR COMPRESSORS.

APPLICATION FILED APR. 7, 1919.

Reissued June 10, 1919.

14,662.

3 SHEETS—SHEET 1.

INVENTOR

Harry V. Haight

BY

Joseph H. Schofield

ATTORNEY

H. V. HAIGHT.

UNLOADER FOR COMPRESSORS.

APPLICATION FILED APR. 7, 1919.

Reissued June 10, 1919.

14,662.

3 SHEETS—SHEET 2.

INVENTOR
Harry V. Haight
BY
Joseph K. Schofield
ATTORNEY

H. V. HAIGHT.

UNLOADER FOR COMPRESSORS.

APPLICATION FILED APR. 7, 1919.

Reissued June 10, 1919.

14,662.

3 SHEETS—SHEET 3.

UNITED STATES PATENT OFFICE.

HARRY V. HAIGHT, OF SHERBROOKE, QUEBEC, CANADA, ASSIGNOR TO INGERSOLL-RAND COMPANY, OF JERSEY CITY, NEW JERSEY, A CORPORATION OF NEW JERSEY.

UNLOADER FOR COMPRESSORS.

14,662. Specification of Reissued Letters Patent. Reissued June 10, 1919.

Original No. 1,291,854, dated January 21, 1919. Serial No. 152,019, filed March 2, 1917. Application for reissue filed April 7, 1919. Serial No. 288,339.

*To all whom it may concern:*

Be it known that I, HARRY V. HAIGHT, a subject of the King of England, residing at Sherbrooke, in the Province of Quebec, Dominion of Canada, have invented certain new and useful Improvements in Unloaders for Compressors, of which the following is a specification.

This invention relates to compressors and in particular to intake valves for admitting the fluid to be compressed and also arranged to regulate the load on the compressor.

The objects of my invention are to provide a compressor with a valve casing carrying a plurality of valves adapted to admit fluid to the compressor and which may be thrown out of operation to partly or completely relieve the load on the compressor.

With these and other objects in view, my invention consists in the features of construction and operation set forth in the following specification and claims and illustrated in the accompanying drawings.

In the drawings forming a part of this specification,

Figure 2:
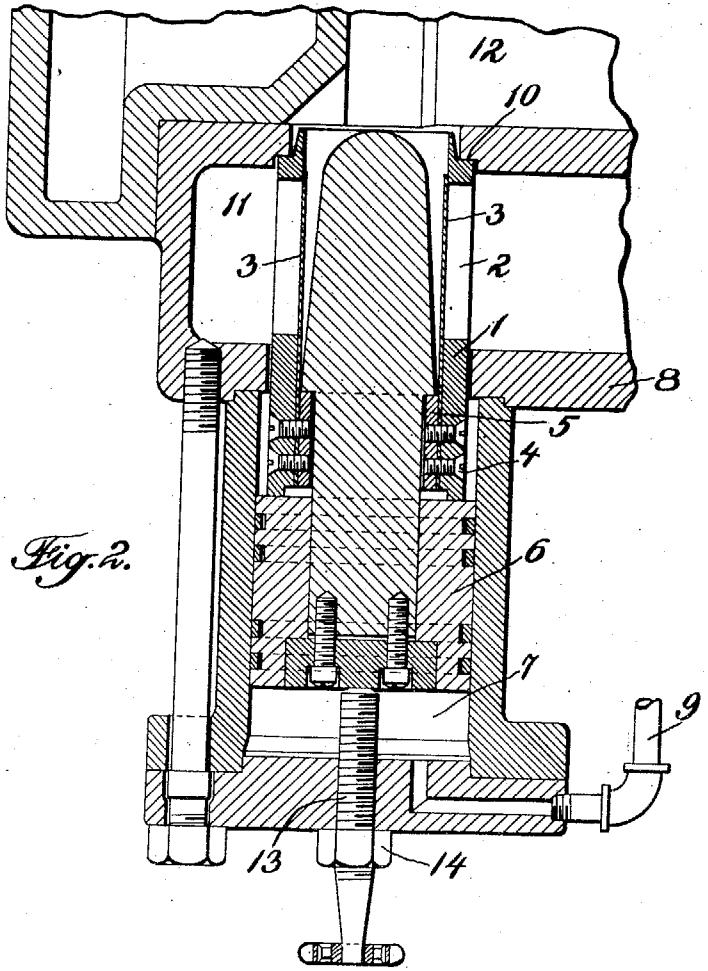
Fig. 2 shows another type of my improved construction.
Figure 1:
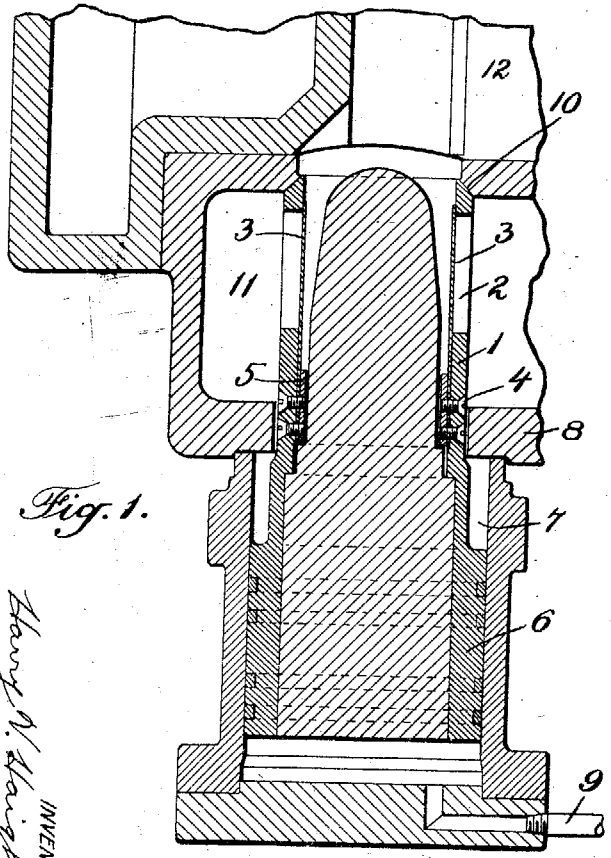
Figure 1 shows one type of my improved construction.
Figure 6:
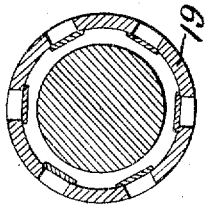
Fig. 6 is a cross section of the valve casing on the line B—B of Fig. 3.
Figure 7:
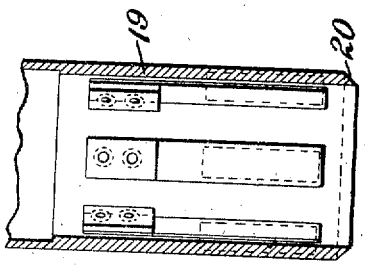
Fig. 7 is a longitudinal section of the valve casing and valves.
Figure 5:
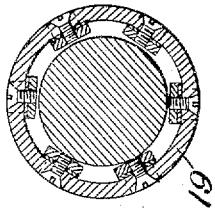
Fig. 5 is a cross section of the valve casing on the line A—A of Fig. 3.
Figure 4:
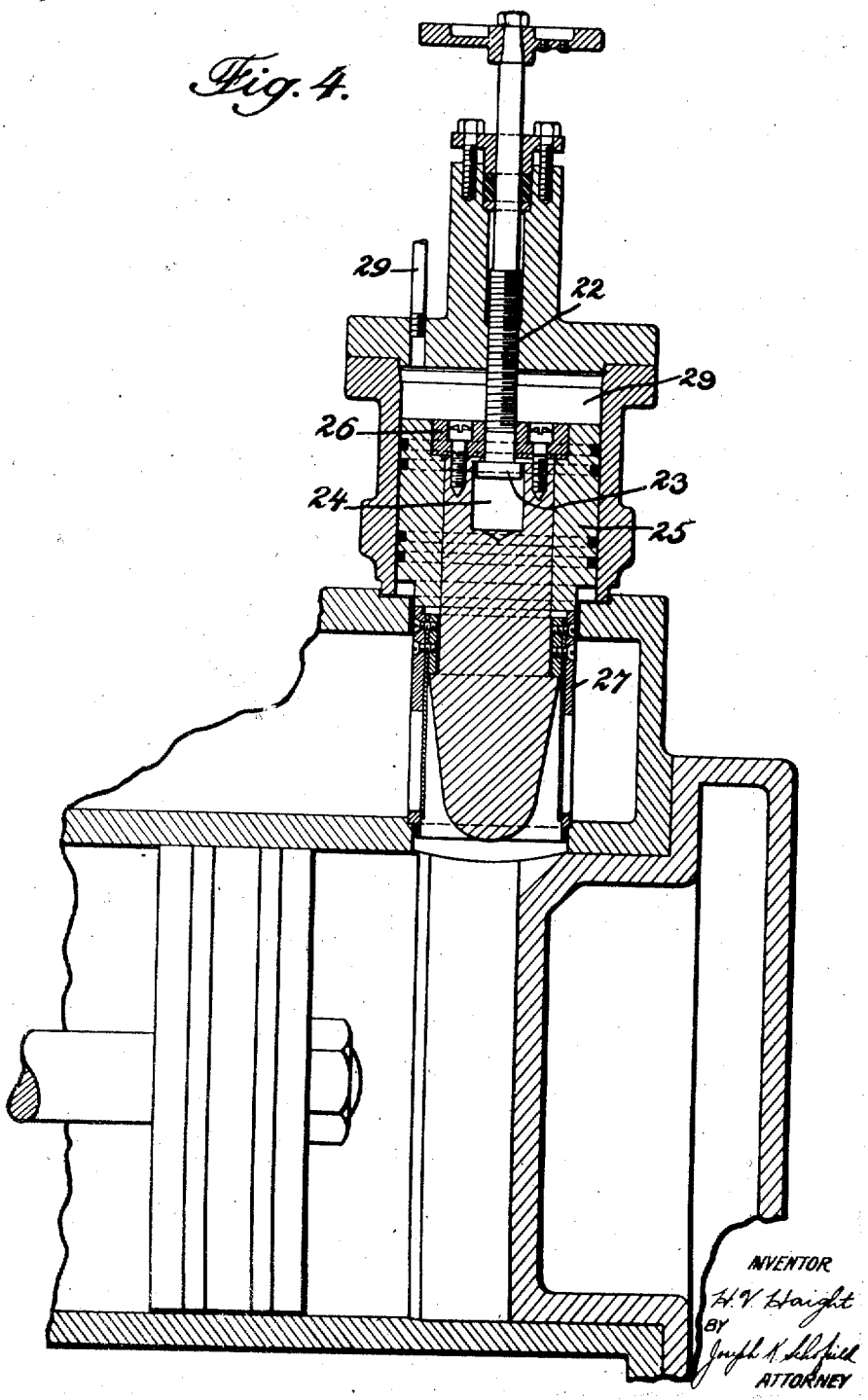
Fig. 4 shows a further modification of my valve casing and unloader.

Referring to Fig. 1 of the drawing, my improved inlet valve casing and unloader is shown in the position it occupies when the compressor is being operated under load. As shown in this figure, the valve casing comprises a hollow tubular shell 1 having ports or openings 2 over which leaves 3 are fitted to make a tight joint. Each leaf 3 is fastened separately to the valve casing 1 preferably by means of screws 4 extending through the valve casing 1, the leaf 3 and a backing plate 5. Extending from the valve casing 1 is a piston 6 which may be formed integrally with the valve casing 1 or separately as shown in Figs. 2 and 4. The piston 6 is operated forwardly and backwardly in a cylinder 7 which is secured in position on the wall of the intake passage 8. With the intake passages arranged in the lower portion of the compressor cylinder 12, as shown in Fig. 1 and when there is no pressure supplied in the cylinder 7 below the piston 6 through pipe 9, the piston 6 falls of its own weight to the lower portion of this cylinder 7 and thus the valve casing lowered from its seat 10 opening a free passage from the intake passage 11 to the cylinder of the compressor 12 and thus preventing any compression of the fluid. Any suitable means (not shown) may be used to control the admission of fluid under pressure to the pipe 9 and cylinder 7. Should it be desired to operate the compressor under full load continuously, as, for instance, when a constant pressure is not desired, a screw 13 may be threaded through the head of cylinder 7 so that the valve casing 1 may be held permanently to its seat 10, as shown in Fig. 2. Preferably, a lock nut 14 is provided to secure the screw 13 in place.

Figure 3:
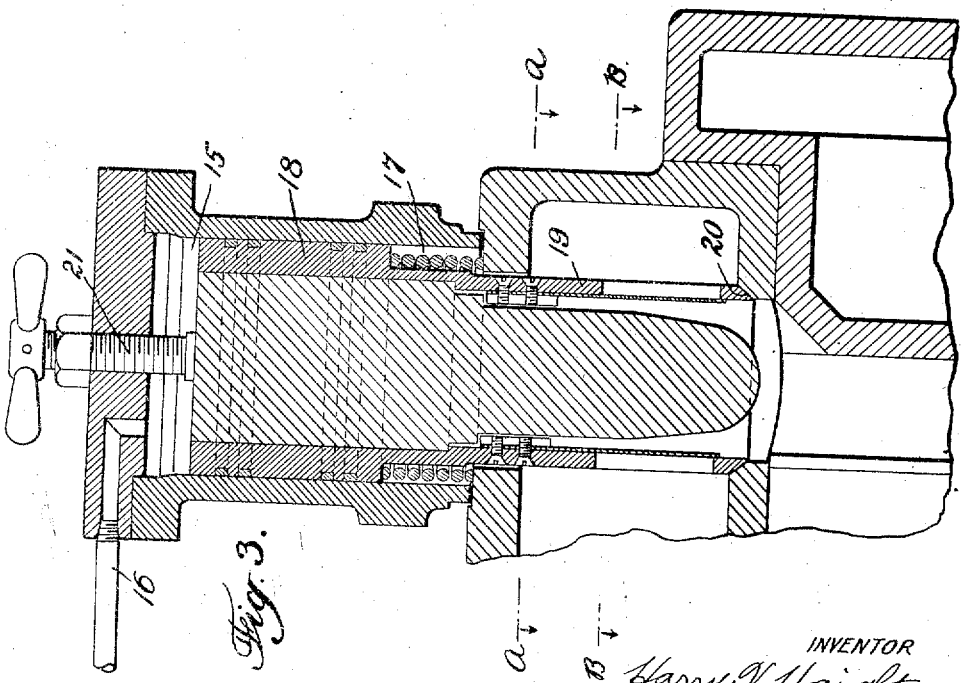
Fig. 3 shows a type of my improved construction provided with a valve casing and unloader when used on the upper part of the compressor.

In Fig. 3 a slight modification is shown in which the valve casing is arranged for a compressor in which the intake passages are in the upper portion of the compressor. In this case when the fluid under pressure supplied to the cylinder 15 by the regulator through the pipe 16 is reduced, as, for instance, when the pressure in the receiver has been brought up to the pressure desired, a spring 17 which is placed in the cylinder 15 on the valve side of piston 18 expands to lift the valve 19 from its seat 20. This form of valve casing may also be provided with a screw 21 threaded through the head of the cylinder 15 to hold the valve casing 19 to its seat when it is desired to operate the compressor continuously under loaded condition.

The modification shown in Fig. 4 is provided with a screw of considerably different type than that shown at 13 in Fig. 2. In Fig. 4 the screw 22 is provided at its lower end with a head 23 which fits into a hole 24 drilled into the upper end of piston 25 and is covered and retained in place by a plate 26 set into the upper end of the piston 25 and closely surrounding the screw 22. When the compressor is operated with the screw 22 in the position shown in Fig.

4 the piston 25 and consequently the valve casing 27 will be held firmly in the position shown by pressure supplied to the cylinder 28 in the rear of the piston 25 through the medium of the regulator pipe 29. If, however, it should be desired to keep the compressor operating under full load continuously, the screw 22 would be screwed down against the bottom of the drilled hole 24, while in starting the compressor or operating without load the screw 22 would be drawn back to its full extent and the piston held against the rear of the cylinder, thus holding the valve casing from its seat.

It is to be understood that while the present showing and description disclose certain specific embodiments of the present invention, other forms and modifications are included within the spirit and scope thereof, as expressed in the appended claims.

What I claim is:

1. In an unloader for compressors, in combination, a valve casing carrying a plurality of valves, a seat for said valve casing, a piston mounted on said valve casing, and means for holding said valve casing against its seat.

2. In an unloader for compressors in combination, a valve casing carrying a plurality of valves, a seat for said valve casing, a piston mounted on said valve casing and means controlled by fluid pressure for holding said valve casing against its seat.

3. In an unloader for compressors, in combination, a valve casing carrying a plurality of leaf valves, a seat mounted on the compressor for said valve casing, a piston mounted on said valve casing and means for holding said valve casing against its seat.

4. In an unloader for compressors, in combination, a valve casing carrying a plurality of leaf valves, a seat mounted on the compressor for said valve casing, a piston mounted on said valve casing and means controlled by fluid pressure for holding said valve casing against its seat.

5. In an unloader for compressors, in combination, a valve casing carrying a valve, a seat for said valve casing, a piston mounted on said valve casing and means for holding said valve casing against its seat and also away from its seat.

6. In an unloader for compressors, in combination, a valve casing, said valve casing being adapted to seat against a compressor cylinder and fluid operated means to retain said valve casing against said compressor cylinder and positively acting means to hold said valve casing from its seat.

7. In a compressor, in combination, a cylinder, an intake passage, a valve casing mounted in said intake passage and seating against said cylinder, fluid operated means holding said valve casing against its seat and means to withdraw said valve casing from its seat.

8. In a compressor, in combination, a cylinder, an intake passage, a valve casing carrying a plurality of valves mounted in said intake passage, and seating against said cylinder, means holding said valve casing against its seat and means to withdraw said valve casing from its seat.

9. In a compressor, in combination, a cylinder, an intake passage, a valve casing mounted in said intake passage, and seating against said cylinder, a piston mounted on said valve casing and fluid means acting upon said piston to hold said valve casing against its seat.

In testimony whereof, I have hereunto set my hand.

HARRY V. HAIGHT.